Aug. 17, 1926.

J. GINSBURG 1,596,524

RADIOTUBE TEST PLUG

Filed May 10, 1924

INVENTOR
Joseph Ginsburg
BY
Cornelius C. Billings
ATTORNEY

Patented Aug. 17, 1926.

1,596,524

UNITED STATES PATENT OFFICE.

JOSEPH GINSBURG, OF BROOKLYN, NEW YORK.

RADIOTUBE TEST PLUG.

Application filed May 10, 1924. Serial No. 712,183.

This invention relates to a testing device for radio apparatus and, more particularly, to a device insertable into an electron, or radio tube socket, to determine whether the battery connections thereto are correct or whether too high voltage is connected to the filament contacts of the tube.

Radio tube sockets, of the type with which the present invention is concerned, are provided with two pair of contact terminals spaced to contact with pairs of contacts on a radio tube inserted thereinto, one pair of these contact terminals being arranged to be connected to leads having a low difference of potential as to an "A" battery and the other pair arranged for connection to leads having a relatively higher potential difference as to a "B" battery. In connecting these pairs of terminals, the low potential terminals may accidentally be connected in a high potential circuit and, if the radio tube be then inserted, its destruction will result, owing to the insertion into the higher potential circuit and burning out of the filament which should be connected to the low voltage or "A" battery.

An object of the present invention is to provide a testing device by which the wiring of radio apparatus may be tested prior to the insertion of a radio tube or similar apparatus to guard it against destruction through excessive voltages or incorrect battery connections.

Another object of the invention is to provide a testing device of the type mentioned above which will give a positive indication when the battery wiring is correct and a distinct and noticeable indication when the wiring is incorrect and when the low voltage terminals are connected to the "B" or high potential battery.

With these and other objects in view, the invention comprises the device described and set forth in the following specification and claims.

The various features of the invention are illustrated in the accompanying drawings, in which.

Figure 1:
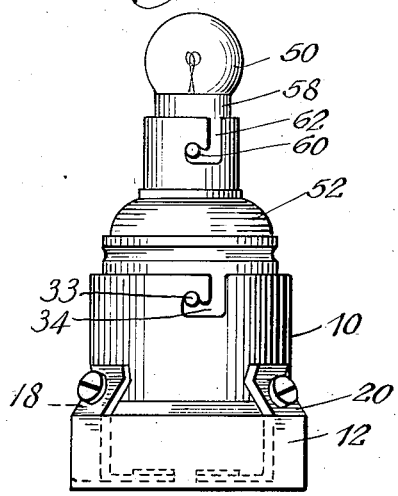
Fig. 1 is a side view of a radio tube socket and testing device embodying a preferred form of the invention.

In my present invention, the testing device is provided with a portion adapted to be inserted into a radio tube socket in the same manner as a radio tube and is provided with four contact terminal pins spaced to contact with the four contact terminals of the socket. Of these terminal pins, one pair, positioned to contact with the higher potential or "B" battery terminals, are insulated from each other and from other circuits, while the other pair, contacting with the lower potential or "A" battery terminals are connected with terminals in a socket adapted to receive a small incandescent light bulb or other suitable filament which will be burnt out when connected to the higher potential, or "B" battery, terminals. When the radio tube socket terminals are correctly connected to their respective batteries, therefore, the incandescent bulb will glow, indicating the correctness of the connections, while if incorrectly connected so that a dangerous or destructive voltage would be connected to the filament of the tube, the filament of the testing bulb will be fused or burned thus indicating the incorrect wiring dangerous voltage condition.

Referring more particularly to the accompanying drawings, the testing device is shown as applied to a socket having an upright cylindrical wall 10 and a base 12 of insulating material in which are mounted a pair of spring terminals 14 and 16 for connection to the lower voltage or "A" battery and a pair of spring terminals 18 and 20 for connection to the higher potential or "B" battery. The testing device comprises a base portion for insertion into the wall 10 of the radio tube socket, and having a cylindrical wall 22 fitting into the cylindrical wall 10 and having a bottom plate 24 of insulating material in which are mounted a pair of contact terminal pins 26 and 28 extending downwardly and positioned to contact with the terminals 14 and 16 when the testing device is inserted into the socket, and a second pair of contact terminal pins 30 and 32 extending downwardly in position to contact with the terminals 18 and 20. The wall 22 is provided with a pin 33 insertable into a bayonet slot 34 in the wall 10 to properly position the pins on their respective socket terminals. The plate 24 is held in the wall 22 by means of a bottom flange 35 and an inwardly pressed ridge or bead 36.

The terminal pins 30 and 32, which contact with the terminals 18 and 20 of the higher potential or "B" battery, are embedded in the insulating plate 24 in such a manner as to be insulated from each other and from other connections, so that the "B" battery circuit remains open when the testing device is inserted. These terminal pins therefore serve merely to render the pin arrangement similar to that of a radio tube and enable the device to fit the socket.

Figure 2:
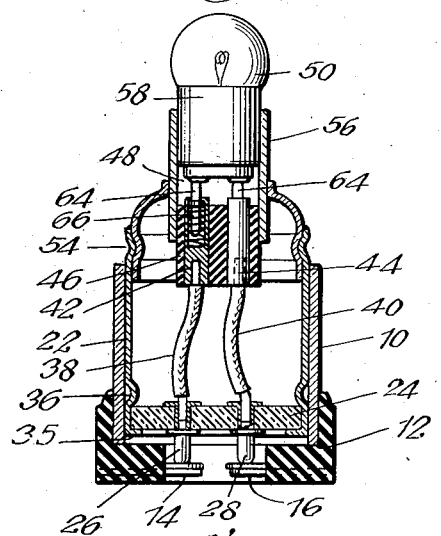
Fig. 2 is a vertical sectional view of the testing device and socket taken on line 2—2 of Fig. 3.
Figure 3:
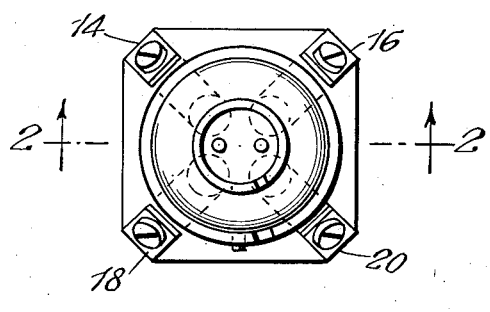
Fig. 3 is a plan view of the testing device and socket, the lamp shown in Figs. 1 and 2 being removed.

The terminal pins 26 and 28 are also embedded in the insulating plate 24 and insulated from each other but are connected through connecting wires 38 and 40 to a pair of contacts 42 and 44 mounted in a block of insulating material 46 in the bottom of a small socket 48 for receiving the base of a small incandescent bulb 50 or similar device having a filament that will fuse under the high potentials of the "B" battery. As indicated in Figs. 1 and 2, the bulb socket 48 may be mounted on the wall 22 by means of an annular domed cap 52 held in the upper end of the wall 48 by means of an internal bead 54 and soldered to the upright cylindrical wall 56 of the socket 48, the lower end of which is plugged by means of the insulating block 46. In the form of embodiment shown in Figs. 1 and 2, the base 58 of the bulb 50 is held in the socket 48 by means of a pin 60 which is inserted into an angular slot 62 in the wall 56 forming a bayonet joint which holds the base of the bulb tightly against the terminals 42 and 44. The terminals 42 and 44 are provided with contact pins 64 resiliently pressed upwardly against the bottom of the base 58 by means of springs 66 in the body of the terminal.

Figure 5:
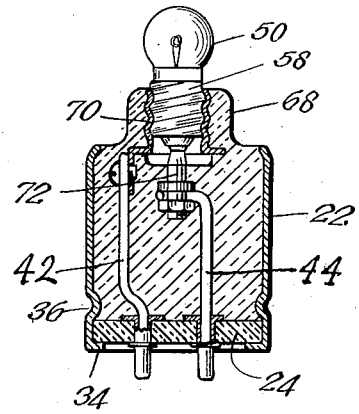
Fig. 5 is a view in vertical section of a modified form of testing device.
Figure 4:
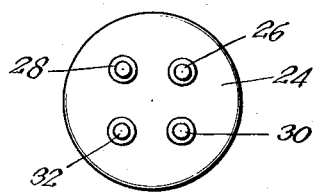
Fig. 4 is a bottom view of the testing device.

In the embodiment shown in Fig. 5 a screw socket is used and is supported in the device by means of a body of plastic material 58 filling the wall 22 and in which the socket members are embedded. The wires 42 and 44 pass through and are embedded in the material 68, one wire, 42, being connected at its upper end to a screwthreaded collar 70 embedded in the upper portion of the block 68 to form the wall of the bulb socket, and the other wire, 44, being connected at its upper end to a central contact 72 also embedded in the block 68.

When the terminals 14, 16, 18 and 20 are properly connected to their respective batteries and the testing device inserted in the manner of a radio tube, the contacts 18 and 20 will not be bridged and the higher potential circuit through them will remain open. The terminals 14 and 16 will however be connected to the terminals of the bulb 50 and, if these terminals are properly connected to the "A" or low voltage battery, the bulb 50 will glow, a low voltage bulb, such as those used for automobile, flashlight, or Christmas tree lighting being used for this purpose. The glowing of this bulb thus indicates not only that the tube socket terminals are properly connected but also that the testing apparatus is operating effectively; an absence of glow indicates that there is a broken circuit either in the testing apparatus or in the radio circuits. If, however, the terminals 14, 16, 18 and 20 are incorrectly wired or connected in the radio apparatus, and a dangerous voltage is connected across the terminals 14 and 16, the current passing through the bulb 50 when the testing device is inserted will be sufficient to fuse the bulb filament, burning out the same and causing a sudden flash and subsequent failure to glow which serves as a certain indication of the dangerous condition of the circuits. In this manner, the destruction of the bulb 50, which is comparatively inexpensive and may be easily replaced, guards against the destruction of the much more expensive radio tube.

As changes of construction could be made within the scope of my invention it is intended that all matter contained in the above description or shown in the accompanying drawings be interpreted as illustrative and not in a limiting sense.

Having described the invention, what I claim and desire to secure by Letters Patent is:

1. A device of the type described which comprises, a plug member having a socket member to receive a lamp base, and a plug portion adapted to be inserted into a radio tube socket, a pair of contacts on said plug portion connected to said lamp base socket, a pair of insulated terminals positioned to contact with the higher potential terminals of said radio tube socket and to maintain said terminals in open circuit.

2. A device of the type described which comprises, a plug member having a socket member to receive a lamp base, and a plug portion adapted to be inserted into a radio tube socket, a pair of contacts on said plug portion connected to said lamp base socket, a pair of insulated terminals positioned to contact with the higher potential terminals of said radio tube socket and to maintain said terminals in open circuit, and means for positioning said plug portion to bring said terminals into contact with their respective socket terminals.

3. A device of the type described which comprises, a plug member having a socket member to receive a lamp base, and a plug portion adapted to be inserted into a radio tube socket, a pair of pin contacts on said plug portion connected to said lamp base socket, a pair of insulated pin terminals positioned to contact with the higher potential terminals of said radio tube socket and to maintain said terminals in open circuit, and means for positioning said plug portion to bring said pin terminals into contact with their respective socket terminals.

4. In combination with a radio tube socket having contacts for connection with batteries, a testing device comprising a plug, fitting into said tube socket and having a base, a lamp socket in said plug for receiving a low voltage test lamp, a pair of terminals in said base for coaction with the said contacts of a battery, means for positioning said plug to bring said terminals into connection with said last named contacts and electrical connections between said terminals and said lamp socket.

JOSEPH GINSBURG.